United States Patent
Che et al.

(10) Patent No.: US 7,987,439 B2
(45) Date of Patent: Jul. 26, 2011

(54) METHOD AND APPARATUS FOR ANALYZING CIRCUIT MODEL BY REDUCTION AND COMPUTER PROGRAM PRODUCT FOR ANALYZING THE CIRCUIT MODEL

(75) Inventors: Hong Bo Che, Pohang (KR); Young Hwan Kim, Pohang (KR)

(73) Assignee: Postech Academy-Industry Foundation, Pohang, Kyungsangbuk-Do (KR)

(*) Notice: Subject to any disclaimer, the term of this patent is extended or adjusted under 35 U.S.C. 154(b) by 723 days.

(21) Appl. No.: 12/027,732

(22) Filed: Feb. 7, 2008

(65) Prior Publication Data
US 2008/0209366 A1    Aug. 28, 2008

(30) Foreign Application Priority Data
Feb. 27, 2007 (KR) .................. 10-2007-0019929

(51) Int. Cl.
*G06F 17/50* (2006.01)
(52) U.S. Cl. ................ 716/103; 716/106; 703/14
(58) Field of Classification Search ............... None
See application file for complete search history.

(56) References Cited

U.S. PATENT DOCUMENTS

| | | | | |
|---|---|---|---|---|
| 5,379,231 A * | 1/1995 | Pillage et al. | ............... | 703/14 |
| 5,469,366 A * | 11/1995 | Yang et al. | ............... | 716/6 |
| 6,374,205 B1 * | 4/2002 | Kuribayashi et al. | ............... | 703/14 |
| 7,243,313 B1 * | 7/2007 | Qin et al. | ............... | 716/2 |
| 7,283,943 B1 * | 10/2007 | Qi et al. | ............... | 703/14 |
| 7,441,213 B2 * | 10/2008 | Lehner et al. | ............... | 716/5 |
| 7,788,079 B2 * | 8/2010 | Wu et al. | ............... | 703/14 |
| 2003/0106030 A1 * | 6/2003 | Keller et al. | ............... | 716/4 |

FOREIGN PATENT DOCUMENTS
WO    2004/068507 A1    12/2004

OTHER PUBLICATIONS
Patent Abstracts of Japan, Publication No. 2003-223478, Publication Date Aug. 8, 2003.

* cited by examiner

*Primary Examiner* — Leigh Marie Garbowski
(74) *Attorney, Agent, or Firm* — Perman & Green, LLP

(57) ABSTRACT

Provided are a method and apparatus for analyzing a circuit model by reducing, and a computer program product for analyzing the circuit model. The circuit model at least includes independent current source models, resistance models, and capacitance models. Also, the circuit model forms a resistance capacitance (RC) network with independent current sources. The method includes selecting a node to be removed using resistance information and comparing conductance of a capacitor for a given time step and the total conductance of the node. Further, the method includes removing the selected nodes and generating RC elements and independent current sources using adjacent nodes, which maintain the accuracy of node voltages of a circuit reduced in an accuracy order used for entrywise perturbation of the corresponding circuit equation. Moreover, an efficient method of handling the independent current sources while reducing the circuit is provided.

14 Claims, 4 Drawing Sheets

METHOD AND APPARATUS FOR ANALYZING CIRCUIT MODEL BY REDUCTION AND COMPUTER PROGRAM PRODUCT FOR ANALYZING THE CIRCUIT MODEL

CROSS-REFERENCE TO RELATED PATENT APPLICATION

This application claims the benefit of Korean Patent Application No. 10-2007-0019929, filed on Feb. 27, 2007, in the Korean Intellectual Property Office, the disclosure of which is incorporated herein in its entirety by reference.

BACKGROUND OF THE INVENTION

1. Field of the Invention

The present invention relates to a method and apparatus for analyzing a circuit model by reduction, and a computer program product for analyzing the circuit model, and particularly, to a method and apparatus for efficiently analyzing a circuit model which includes a large number of linear floating resistances, an RC network formed of a grounded capacitance, and a large number of independent current sources, and a computer program product for analyzing the circuit model.

More particularly, the present invention relates to a method and apparatus for analyzing a circuit model by reduction, which can maintain the same level of node voltage in a reduced circuit as a corresponding node voltage of an existing circuit before the reduction, effectively reduce a very large scale circuit with a large number of nodes by using an effective method of reducing a circuit including an RC network and current sources and generating a reduced circuit, and significantly reduce the time required for analyzing the power noise of a chip, which is a significant problem, and the time required for designing a semiconductor chip, and a computer program product for analyzing the circuit model.

2. Description of the Related Art

In recent years, there has been an increased demand for designing very large scale integration (VLSI) circuits having high performance and low power consumption. High performance is achieved by technology scaling, increased functionality, and competitive designs. On the other hand, a common technique used to obtain low-power designs is to scale down supply voltage. This stands to reason, since a chip power P is proportional to the square of supply voltage Vdd. Thus, the demand for high performance and low power consumption has led to modern VLSI designs being characterized by reduced feature size, increased functionality, and lower supply voltage.

Increased chip functionality results in the need for huge power distribution networks. Lower supply voltage, on the other hand, makes the voltage variation across the power distribution network very critical since it may lead to chip failures. In order to provide an ideal supply voltage to each function block in a chip, there must be no loss in a power distribution network. However, an actual power distribution network consists of a lot of small parasitic RC elements, which prevent transferring the ideal voltage value to the function blocks. IR-drop is a voltage fluctuation occurred due to these parasitic RC elements. IR-drop analysis has become an indispensable step for design verification for VLSI design.

IR-drop analysis includes the parasitic RC elements and the function blocks. However, it is impossible to simulate the circuit using a transistor-level simulator due to the non-linear characteristic of the function blocks, which is one of main reasons that make the transistor-level simulation infeasible in most real applications. Thus, the function block is further modeled as independent current sources. However, it is still difficult to analyze the modeled circuit with the transistor-level simulator due to the large size of the circuit. Therefore, it is important to reduce the circuit before analyzing the circuit.

According to a method of analyzing a circuit model by reduction, the size of the circuit is reduced as to lower the complexity of analyzing the circuit. Ideally, the circuit is reduced as small as possible while maintaining the same level of node voltages in the reduced circuit as corresponding node voltages of the circuit before the reduction. Such a method results in a reduced circuit consisting of RC elements with independent current sources.

A power distribution network consists of an RC network with a large number of independent current sources modeled the functional block. Conventional methods of analyzing a circuit model by reduction are used in a circuit only with RC elements. Moreover, a method of selecting a node for controlling an error while reducing the circuit does not exist. Accordingly, a new method of analyzing a circuit model by reduction is required, which can reduce a circuit consisting of an RC network with a large number of independent current sources while maintaining the same level of node voltages in the reduced circuit as corresponding node voltages of the circuit before the reduction and which has a high reduction ratio.

SUMMARY OF THE INVENTION

The present invention provides a method and apparatus for analyzing a circuit model by reduction, and a computer program product for analyzing the circuit model, and more particularly, to a method and apparatus for efficiently analyzing a circuit model which includes a large number of linear floating resistances, an RC network formed of a grounded capacitance, and a large number of independent current sources, and a computer program product for analyzing the circuit model.

The present invention also provides a method and apparatus for analyzing a circuit model by reduction, which can maintain the same level of node voltage in a reduced circuit as a corresponding node voltage of an existing circuit before the reduction, effectively reduce a very large scale circuit with a large number of nodes by using an effective method of reducing a circuit including an RC network and current sources and generating a reduced circuit, and significantly reduce the time required for analyzing the power noise of a chip, which is a significant problem, and the time required for designing a semiconductor chip, and a computer program product for analyzing the circuit model.

According to an aspect of the present invention, there is provided a method of analyzing a circuit model by reduction, the method including: inputting information about the circuit model, the information comprising a circuit net list with independent current sources and a node state information of each of a plurality of nodes in the circuit model; selecting one of the nodes to be removed; removing the selected node and generating a reduced circuit; and post-processing a reduced circuit net list from intermediate data of the reduced circuit.

According to another aspect of the present invention, there is provided a computer program product for performing a circuit simulation by realizing a reduced circuit of a power distribution network for simulating the power distribution network, the computer program product embodied on a computer-readable medium and comprising instructions, the instructions including: inputting information about the circuit model, the information comprising a circuit net list with independent current sources and node state information of each of a plurality of nodes in the circuit; selecting one of the nodes to be removed; removing the selected node and generating a reduced circuit; and post-processing a reduced circuit net list from intermediate data of the reduced circuit.

According to another aspect of the present invention, there is provided an apparatus for analyzing a circuit model by reduction, the apparatus including: a processor; a memory; and instructions stored in the memory and executed by the processor, for: inputting information about the circuit model, the information comprising a circuit net list with independent current sources and node state information of each of a plurality of nodes in the circuit; selecting one of the nodes to be removed; removing the selected node and generating a reduced circuit; and post-processing a reduced circuit net list from intermediate data of the reduced circuit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
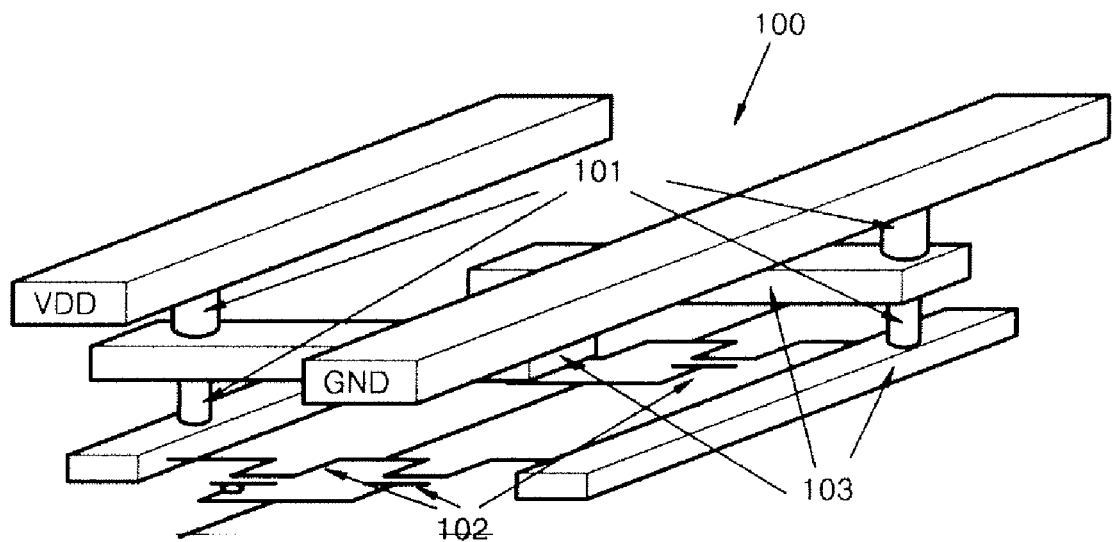
FIG. 1 is a schematic diagram illustrating a portion of a power distribution network of an integrated circuit, according to an embodiment of the present invention.
Figure 2:
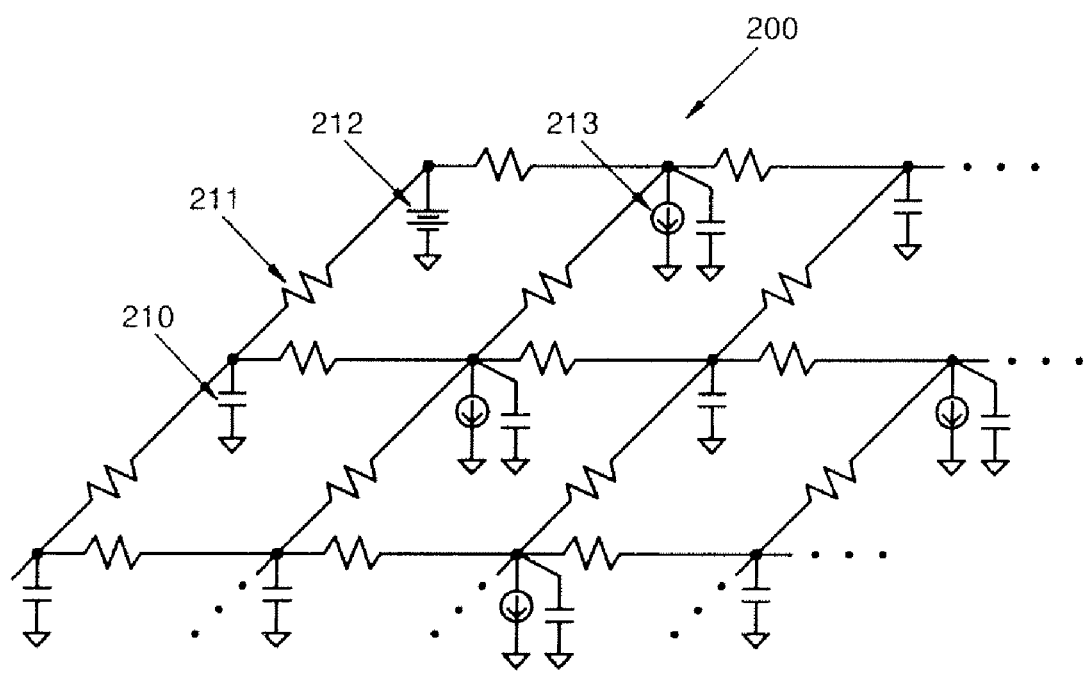
FIG. 2 is a schematic diagram illustrating a power network circuit model according to an embodiment of the present invention.

FIG. 1 is a schematic diagram illustrating a portion of a power distribution network 100 of an integrated circuit, according to an embodiment of the present invention Power distribution within a very large scale integration (VLSI) circuit is performed from the top level of a metal layer of the power distribution network 100. Referring to FIG. 1, the top level of the metal layer is connected to a package through interlayer vias 101, and finally to an active device 102. Metal wires 103 and the interlayer vias 101 are modeled as a linear, time invariant, and passive network consisting of resistive, capacitive, and rarely-inductive elements. A power network of a VLSI circuit, such as a microprocessor, can include millions of nodes and tens of millions of electrical devices. Models of power sources and drains can be quite complex. However, the huge size of power grids makes it infeasible to include any but the simplest models for power sources and drains in the power grids. Hence, power sources are modeled as simple constant voltage sources and power drains are modeled as independent time-varying current sources. Thus, a given VLSI system is usually modeled as an RC network. FIG. 2 is a schematic diagram illustrating a power network circuit model 200 according to an embodiment of the present invention. Referring to FIG. 2, the power network circuit model 200 includes floating linear resistors 211, grounded linear capacitors 210, a constant DC voltage source 212, and independent grounded current sources 213 that represent logic gates. The constant DC voltage source 212 can be converted to a constant DC current source and an equivalent ground resistance. In the current embodiment, a piecewise linear (PWL) current source is used as an independent current source. An operation of the power distribution network circuit model can be expressed as an ordinary differential equation as shown in Equation 1.

$$G \cdot x(t) + C \cdot \dot{x}(t) = u(t) \quad \text{(Equation 1)}$$

Here, G is a conductance matrix, C is a diagonal capacitance matrix, x(t) is node voltages, and u(t) is independent current sources. The differential system is then converted to a linear algebraic system at respective points in time as the following Equation 2, using a Backward Euler method within a time step h, which is determined by the maximum frequency component.

$$A \cdot x(t) = b \quad \text{(Equation 2)}$$

Here, $A = G + C/h$ and $b = u(t) + (C/h) \cdot x(t-h)$. The complexity of solving Equation 2 for x(t) increases super-linearly in accordance with the number of dimensions of the system. Accordingly, it is important to reduce the size of the RC network before analyzing a circuit model. A matrix A of Equation 2 can be expanded as Equation 3.

$$A = G + \frac{C}{h} = \begin{bmatrix} g_{11} + C_1/h & \cdots & -g_{1(N-1)} & -g_{1N} \\ \vdots & \ddots & \vdots & \vdots \\ -g_{N1} & \cdots & -g_{N(N-1)} & g_{NN} + C_N/h \end{bmatrix} \quad \text{(Equation 3)}$$

Here, the matrix A is symmetric and is a diagonally dominant M-matrix. When a node N denotes a node that is to be removed for reducing a circuit, Equation 3 can be rewritten as Equation 4.

$$\begin{bmatrix} A_1 & e \\ e^T & a_{NN} \end{bmatrix} \cdot \begin{bmatrix} x_R(t) \\ x_N(t) \end{bmatrix} = \begin{bmatrix} b_1 \\ b_N \end{bmatrix} \quad \text{(Equation 4)}$$

Here, $e = [a_{1N}, \ldots, a_{(N-1)N}]^T$. Then, the reduced system of equations is given by Equation 5.

$$A_R \cdot x_R(t) = b_R \quad \text{(Equation 5)}$$

Here, $A_R = A_1 - (e \cdot e^T)/a_{NN}$ and $b_R = b_1 - (e/a_{NN})b_N$.

When $A_R = (a'_{ij})$, and $y_{ij}$ and $y_{ii}$ respectively denote the changes of $a'_{ij}$ and $a'_{ii}$ from $a_{ij}$ and $a_{ij}$, which occur while removing a node N, $y_{ij}$ and $y_{ii}$ from Equation 5 can be shown as Equations 6 and 7.

$$y_{ij} = a'_{ij} - a_{ij} = -g_{iN} g_{jN}/a_{NN} \quad \text{(Equation 6)}$$

$$y_{ii} = a'_{ii} - a_{ii} = -g^2_{iN}/a_{NN} \quad \text{(Equation 7)}$$

Here, $a_{NN} = g_{NN} + C_N/h$. Equations 6 and 7 indicate that when $C_N \neq 0$ the corresponding reduced system of equations, that is, Equation 5, cannot be realized as an RC network. However, most nodes in a practical circuit include grounded capacitance, and it is important to obtain a reduced RC network in many applications. Accordingly, when $C_N \neq 0$ and the node N satisfies the inequality of Equation 8, the method according to the current embodiment makes the system of equations realizable by perturbing $a_{NN}$.

$$(C_N/h)/g_{NN} \leq \epsilon \quad \text{(Equation 8)}$$

In Equation 8, $\epsilon$ is a relative error bound given by a user for removing a node. When Equation 8 is not satisfied, the suggested method does not remove the node N. Moreover, the inequality of Equation 8 is not satisfied when the effect of $C_N$ is larger than $\epsilon$ for a given h, by comparing $g_{NN}$ and $C_N$. Conditions of Equation 8 are used to analyze an error of the suggested method.

When $\tilde{a}_{NN}$ denotes a perturbed $a_{NN}$ when removing the node N, the suggested method uses Equation 9 for $\tilde{a}_{NN}$. Equation 9 allows the reduced system to be realizable as described later.

$$\tilde{a}_{NN} = g_{NN}/[1-(C_N/h)/g_{NN}] \quad \text{(Equation 9)}$$

When $a_{NN}$ is substituted to $\tilde{a}_{NN}$ in Equation 6, Equation 10 is obtained.

$$y_{ij} \cong -g_{iN}g_{jN}/g_{NN} + (C_N/h) \cdot (g_{iN}g_{jN}/g^2_{NN}), \ i \neq j \quad \text{(Equation 10)}$$

When $\tilde{A}_R = (\tilde{a}'_{ij})$, a positive capacitive component needs to be removed by removing the second term of Equation 10 in order to realize the system of Equation 10. Then, Equation 11 can be obtained for $\tilde{y}_{ij}$, which is perturbed $y_{ij}$.

$$\tilde{y}_{ij} = \tilde{a}'_{ij} - a_{ij} = -g_{iN}g_{jN}/g_{NN}, \ i \neq j \quad \text{(Equation 11)}$$

$\tilde{y}_{ii}$ can be obtained by replacing $a_{NN}$ by $\tilde{a}_{NN}$ in Equation 7. Through this process, the capacitive component removed from Equation 10 is added to $\tilde{y}_{ii}$ in order to maintain the diagonal dominant part as much as possible. Accordingly, $\tilde{y}_{ii}$ can be expressed by Equation 12.

$$\tilde{y}_{ii} = \tilde{a}'_{ii} - a_{ii} = (-g^2_{iN}/g_{NN} + g_{iN}) - \\ g_{iN} + (C_N/h) \cdot \left(g^2_{iN} + \sum_{k \neq i}^{N-1} g_{iN}g_{kN}\right)/g^2_{NN} \quad \text{(Equation 12)}$$

Since $$g_{NN} = \sum_{i=1}^{N-1} g_{iN}$$

for a linear RC network, Equation 12 can be rewritten as Equation 13.

$$\tilde{y}_{ii} = \left(\sum_{j \neq i}^{N-1} g_{iN}/g_{jN}/g_{NN}\right) - g_{iN} + (C_N/h) \cdot g_{iN}/g_{NN} \quad \text{(Equation 13)}$$

When $\tilde{y}_{ii}$ contains $-g_{iN}$, which is a negative conductance term, $a_{ii}$ contains $g_{iN}$. Thus, $-g_{iN}$ of $\tilde{y}_{ii}$ is canceled out while calculating $\tilde{a}'_{ii}$, which makes $\tilde{A}_R$ realizable. Similarly, a new $\tilde{b}_R(i)$, which is an equivalent current source linked to a node i, can be expressed as Equation 14.

$$\tilde{b}_R(i) = b_1(i) - (g_{iN}/g_{NN}) \cdot b_N \quad \text{(Equation 14)}$$

All nodes that satisfy Equation 8 can be removed together unless the nodes are directly connected to one linear resistor. Finally, circuit elements can be identified by observing each term in Equations 11, 13, and 14. In addition, a matrix $\tilde{A}_R$ of the reduced circuit is also a diagonally dominant M-matrix. Accordingly, it is possible to iteratively reduce the given RC network more than once. Voltage of the node i of the reduced circuit is determined by Equation 15a. Also, a relative error of node voltages is defined by Equation 15b.

$$\tilde{x}_R(i) = \sum_{j=1}^{n-1} \tilde{A}_R^{-1}(i,j) \cdot \tilde{b}_R(j) \quad \text{(Equation 15a)}$$

$$Err_R(i) = |(\tilde{x}_R(i) - x_R(i))/x_R(i)| \quad \text{(Equation 15b)}$$

An investigation of $Err_R$ requires the accuracy of $\tilde{A}_R^{-1}$ and $\tilde{b}_R$ to be examined. An entrywise perturbation theory for a diagonally dominant M-matrices shows that the accuracy of $\tilde{A}_R^{-1}$ with respect to $A_R^{-1}$ is given in the same order as that of $\tilde{A}_R$ with respect to $A_R$. In order to examine the accuracy of $\tilde{A}_R$, off-diagonal terms and a diagonal dominant part should be investigated. A relative error of the off-diagonal term in $\tilde{A}_R$ with respect to $A_R$ can be expressed as Equation 16.

$$\left|\frac{\tilde{a}'_{ij} - a'_{ij}}{a'_{ij}}\right| \leq \left|\frac{-g_{iN}g_{jN}/g_{NN} - (-g_{iN}g_{jN}/a_{NN})}{-g_{iN}g_{jN}/a_{NN}}\right| = \\ \left|\frac{C_N/h}{g_{NN}}\right| \leq \varepsilon \quad \text{(Equation 16)}$$

Then, a relative error of the diagonal dominant part can be obtained using Equations 17a and 17b.

$$d_i = a'_{ii} - \left|\sum_{j \neq i}^{N-1} a'_{ij}\right| = C_i/h + (C_N/h) \cdot g_{iN}/a_{NN} \quad \text{(Equation 17a)}$$

$$\tilde{d}_i = \tilde{a}'_{ii} - \left|\sum_{j \neq i}^{N-1} \tilde{a}'_{ij}\right| = C_i/h + (C_N/h) \cdot g_{iN}/g_{NN} \quad \text{(Equation 17b)}$$

Accordingly, the relative error of the diagonal dominant part can be expressed as Equation 18.

$$\left|\frac{\tilde{d}_i - d_i}{d_i}\right| = \left|\frac{(C_N/h) \cdot (g_{iN}/g_{NN} - g_{iN}/a_{NN})}{C_i/h + (C_N/h) \cdot g_{iN}/g_{NN}}\right| \leq \left|\frac{C_N/h}{g_{NN}}\right| \leq \varepsilon \quad \text{(Equation 18)}$$

Based on an entrywise perturbation theory for the diagonally dominant M-matrix, the relative error of $\tilde{A}_R^{-1}$ with respect to $A_R^{-1}$ in Equations 16 and 18 is bounded by $\epsilon$. In a similar manner, it can be easily concluded that a relative error of $\tilde{b}_R$ is also not larger than $\epsilon$. Since a relative error of the multiplication of two terms is the sum of a relative order of each term, a relative error of the node voltages can be expressed as Equation 19.

$$Err_R(i) \leq \epsilon + \epsilon = 2\epsilon \quad \text{(Equation 19)}$$

Equation 19 indicates that the accuracy of the node voltage in the reduced circuit is determined by $\epsilon$. From Equations 15b and 19, Equation 20 can be derived for a case when a given circuit is reduced more than once, where n is the number of iterated reductions.

$$(1-2\epsilon)^n |x_R(i)| \leq |\tilde{x}_R^{(n)}(i)| \leq (1+2\epsilon)^n |x_R(i)| \quad \text{(Equation 20)}$$

For a small $\epsilon$, a relative error bound of the node voltage can be expressed as Equation 21, showing a linear increase of the relative error bound with the number of iterated reductions.

$$Err_R^{(n)}(i) \leq 2n\epsilon \quad \text{(Equation 21)}$$

A computer program reads the circuit model, which is typically in the form of a net list. In this embodiment, a commonly-used expression for an independent current source and a PWL current source is used. A typical PWL current source contains several parameters in order to describe its operations, such as an initial delay, a number of repeated times, a dozens of time point values, and corresponding current values. However, the present invention uses symbolic information and one relative current scaling factor for a PWL current source while reducing a circuit. This significantly reduces the memory requirements for current source manipulation, which may cause a problem when one circuit contains millions of current sources.

FIG. 2 is a schematic diagram illustrating a power network circuit model according to an embodiment of the present invention. A state of a node in the circuit is required in order to indicate whether the node is to be retained by a user. According to an embodiment of the present invention, both nodes of some circuit elements can be set as nodes to be retained. The circuit elements do not belong to any kind of elements 210, 211, 212, and 213 they occupy a very small portion of the whole circuit. The nodes connecting these circuit elements can be set as nodes to be retained.

Figure 3:
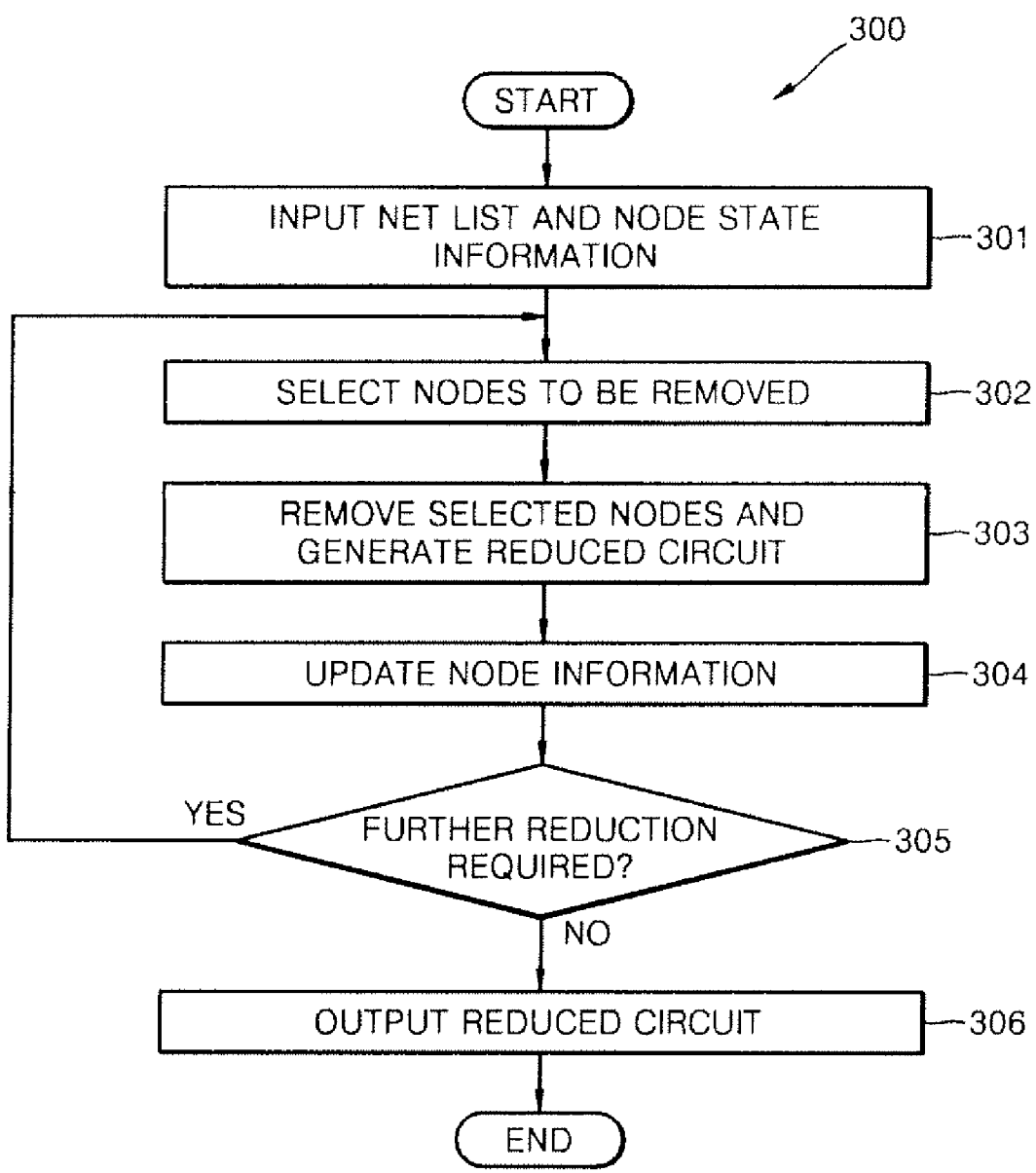
FIG. 3 is a flowchart illustrating a method of analyzing a circuit model by reduction.

FIG. 3 is a flowchart illustrating a method 300 of analyzing a circuit model by reduction, according to an embodiment of the present invention. Referring to FIG. 3, operation 301 is a process of reading data indicating an input circuit using a computer software program, in which a net list and node state information are inputted. For example, when information of a circuit to be reduced is in a commonly used SPICE format, data of such a circuit needs to be converted to data defined by an internal algorithm in order to apply a reduction algorithm. When the circuit is to be reduced, besides data reflecting characteristics of the circuit itself, node state information is separately inputted in case the user desires to retain certain nodes. For example, nodes that the user desires to retain can be marked as 'K', and nodes to be removed can be marked as 'U'. Accordingly, the above information can be read in operation 301, in which initial circuit information is inputted.

In operation 302, nodes to be removed are selected. An equation corresponding to operation 302 is Equation 8, which is used as a basis for determining whether a node is removable during a node selection procedure. After all nodes are searched in operation 302, the number of nodes to be removed is known. According to an embodiment of the present invention, a reduction ratio, which is defined as a ratio of a number of nodes before reduction to a number of nodes after reduction, is selected as one of a plurality of termination conditions. In other words, when the reduction ratio is too high, circuit reduction is not performed any longer, meaning that the circuit cannot be reduced anymore (operation 305). Otherwise, in operation 303, the selected nodes are removed, thereby generating the reduced circuit 306.

Operation 303 of FIG. 3 will now be described in detail.

Equations corresponding to operation 303 are Equations 13 and 14, which are used to determine values of devices while removing the nodes selected as nodes to be removed and generating equivalent circuit devices around the removed nodes. For each removed node, resistors between the removed node and the adjacent nodes are removed, and a grounded capacitor at the removed node is also removed. Then, resistors are created between these adjacent nodes, and the resistances of the resistors are obtained using Equation 10. Next, a new grounded capacitor is added to each of the adjacent nodes, and the capacitance of the capacitor is obtained using Equation 10. In the case of a current source attached to the removed node, a calculated current scaling factor value and a symbolic name of the current source are stored in each adjacent node. The calculated current scaling factor value is determined by Equation 14. When a current source with the same symbolic name already exists in one of the adjacent nodes, the calculated value is added to the term with the same symbolic name. After reducing the circuit by removing all nodes marked as nodes to be removed, the reduced circuit 306 can be reduced again. The above-described processes are repeatedly applied to the reduced circuit 306 until a termination condition is satisfied.

Operation 304 is a step for updating node information, and is required to repeatedly apply the method of analyzing a circuit model by reduction to the circuit. After the previous reduction processes, values of removed nodes, retained nodes, and devices connecting each node change. Accordingly, in order to re-reduce the newly obtained reduced circuit 306, required information should be updated.

Referring to operation 305, when no more reduction is possible or when an iteration number exceeds a value provided by the user, circuit reduction stops. An RC net list is directly generated from the final result of the circuit reduction. A net file, such as a SPICE file, is generated after completing the current source manipulation. A current source finally obtained is calculated using current source name information, containing the final current source obtained through the circuit reduction, and a relative scaling factor value. A PWL independent current source connected to each node of the reduced circuit 306 can be obtained by comparing several different current sources and calculating a value for a new current source from information about the current source.

Figure 4:
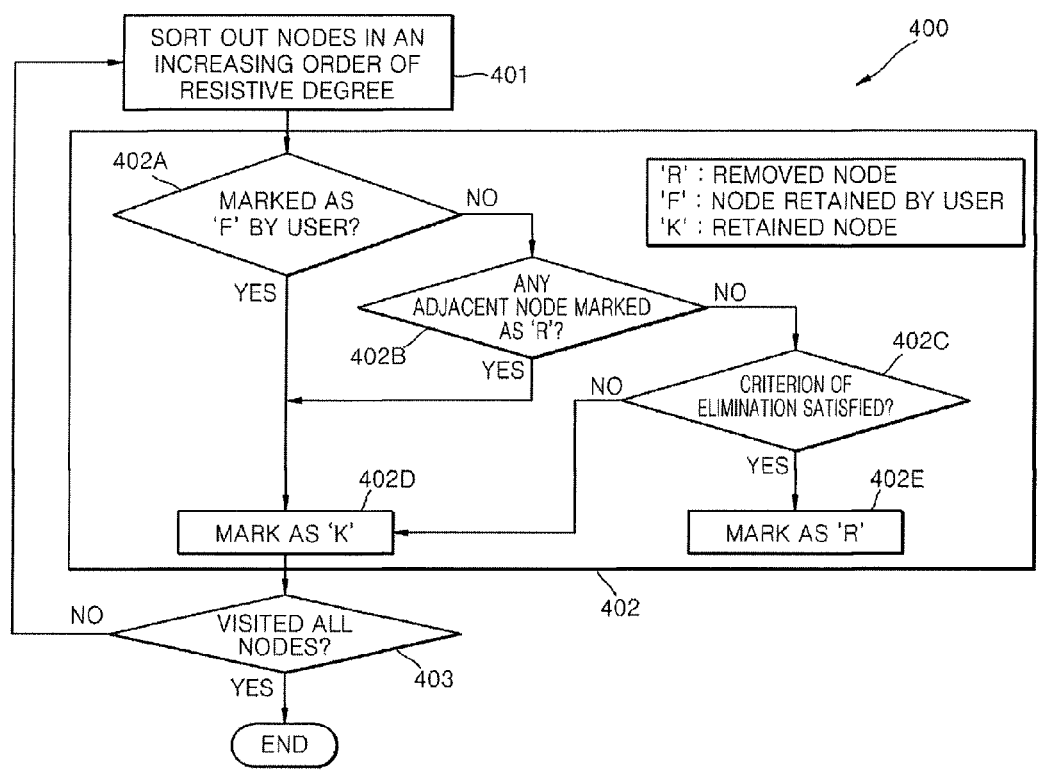
FIG. 4 is a flowchart illustrating a node selection procedure according to an embodiment of the present invention.

FIG. 4 is a flowchart of a node selection procedure 400 according to an embodiment of the present invention. That is, before applying the method of analyzing a circuit model by reduction according to the present invention, removable and non-removable nodes of a circuit are selected, and as many removable nodes as possible are selected while maintaining the relative error of a reduced circuit within a certain limit. Referring to FIG. 4, initially received information is information of each device of a circuit, connection information of each device of the circuit, and state information of nodes, including removable and non-removable nodes. Here, nodes that are determined by the user to be retained are marked as 'F'. Then, final information obtained includes removed nodes marked as 'R' and retained nodes marked as 'K'. The above-described process should be performed on all nodes of the circuit.

Nodes which do not belong to a case described in FIG. 2 are set as undefined nodes before performing the node selection procedure 400 of FIG. 4. All nodes that satisfy Equation 8, which shows a criterion for eliminating a node of operation 402, can be removed together unless the nodes are directly connected through one linear resistor.

First, nodes are sorted in order of resistance in order to select as many nodes as possible for every reduction in operation 401. Then, it is checked to determine if the sorted nodes satisfy Equation 8. When a sorted node satisfies Equation 8, the node is marked as a removed node 'R', and adjacent nodes are marked as retained nodes 'K' in operation 402.

Operation 402 is a process of dividing the nodes into removed nodes and retained nodes by determining each node.

In a first determination step (operation 402A) of operation 402, it is determined whether a node is marked as 'F', signifying a node retained by the user, When the node is marked as 'F', the node is then marked as 'K' in operation 402D.

In a second determination step (operation 402B) of operation 402, when it is determined that the node is not marked as 'F' in operation 402A, it is determined whether adjacent nodes are marked as 'R', considering a case when the adjacent nodes are selected first. When the adjacent nodes are selected as nodes to be removed during the node selection procedure 400, that is, when the adjacent nodes are marked as 'R' in operation 402B, the adjacent nodes are marked as retained nodes 'K' in operation 402D, since there is a rule that continuously adjacent nodes should not be removed together.

In a third determination step (operation 402C) of operation 402, when conditions of operation 402A and 402B are not satisfied, it is determined whether a criterion for eliminating a node is outside the error bound of the reduced circuit when the corresponding node is removed. In this determination step, it is determined whether or not "the criterion for eliminating a node satisfied?" as shown in FIG. 4. When the criterion is satisfied in operation 402C, the node is marked as 'R' in operation 402E, and when the criterion is not satisfied in operation 402C, the node is marked as 'K' in operation 402D. Operation 402C is related to Equation 8.

That is, in operation 402, simple processes of marking a node that is to be retained as 'K' in operation 402D and a node that is to be removed as 'R' in operation 402E through the node selection procedure 400 are shown.

In operation 403, it is determined whether the above-described processes are performed on all nodes of the circuit. It can be easily determined whether the processes are performed on all nodes by numbering the nodes and determining that the processes have been performed on the last node. When the processes are not performed on all nodes, operations 401 and 402 are performed again.

Figure 5:
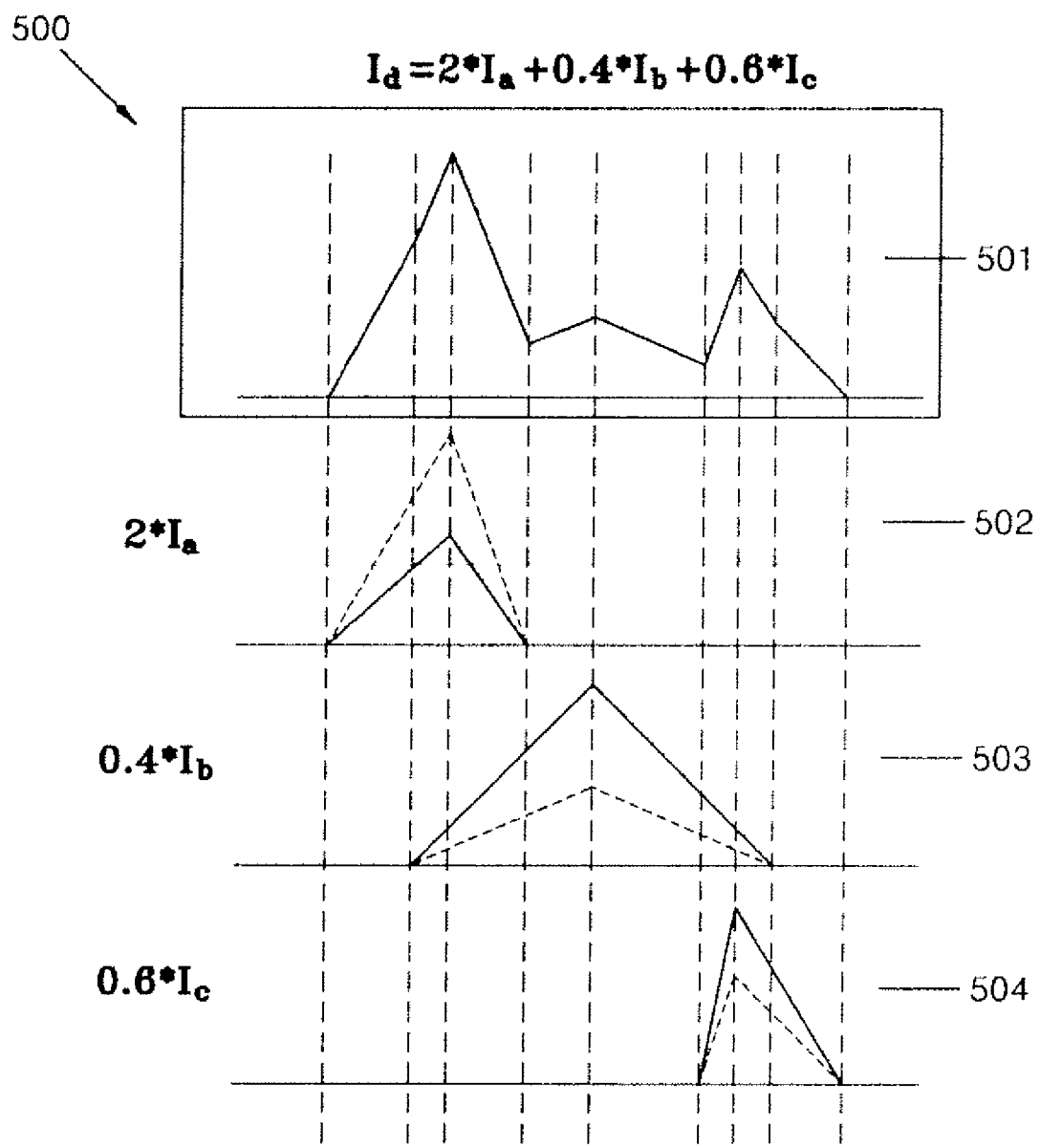
FIG. 5 is a waveform diagram for describing a process of generating a piecewise linear (PWL) current source of a reduced circuit, according to an embodiment of the present invention.

FIG. 5 is a waveform diagram 500 for describing a process of generating a PWL current source of a reduced circuit, according to an embodiment of the present invention. Referring to FIG. 5, a process of obtaining a new current in a post-processing operation of the reduced circuit is explained. Each current source of the reduced circuit is finally formed based on numbers of current sources before the first circuit reduction from the repetitive circuit reductions in several operations, or numbers of nodes, in which the current sources are attached to, and current source scaling factors during the circuit reduction.

FIG. 5 is a waveform diagram of the current sources 213 of the power network circuit model 200 of FIG. 2, for describing in detail a process of generating a current source of a reduced circuit, according to an embodiment of the present invention. Referring to FIG. 5, the waveform diagram 500 includes a waveform 501 of a current source finally obtained. Also, waveforms 502, 503, and 504 are waveforms of current sources 213 before reducing the circuit, and current type coefficients 2, 0.4, and 0.6 on the left of FIG. 5 are current source scaling factors related to the waveform 501 of the finally reduced circuit. Since a current source in a PWL form is selected, an initial point, an end point, and peak points forming the new current source are formed by adding values of an initial point, an end point, and peak points of each current source 213.

That is, after the circuit reduction, a node of the reduced circuit consists of current sources which are described as waveforms 502, 503, and 504 above showing symbolic names and current scaling factor values. In the present invention, a new current value at each time point is obtained by adding the contribution from each current source. The contribution from each current source is directly obtained when the time point and a time point of the new current source are the same. Otherwise, the contribution is obtained by linear interpolation within the period containing that the time point of the new current source. Through the above-described processes, the new PWL current source of the waveform 501 is finally generated. FIG. 5 is related to Equation 14, which determines the current source scaling factor value related to circuit reduction.

A computer program product is any machine-readable medium, such as an EPROM, a ROM, a RAM, a DRAM, a disk memory, or a tape, having recorded on it a computer readable code that, when read by and executed on a computer, instructs the computer to perform a particular function or sequence of functions. A computer having the code loaded on it includes a computer program product because it incorporates the DRAM and/or the disk memory having the code recorded in it. A computer executing the method of analyzing a circuit model by reduction of the present invention would also generally incorporate a program product since a code for the method would typically reside in a memory of the computer while the method is being performed.

An apparatus for performing the method has a memory system, which incorporates one or more levels of a main memory, a cache, and disk memory sub-systems. The memory system has recorded thereon a circuit model and a sequence of machine-readable instructions for instructing a processor to perform the steps of the method 300 illustrated in FIG. 3 on the circuit model as heretofore described. According to an embodiment of the present invention, the memory system is a memory of a digital computer, and the processor is a processor of the digital computer.

As described above, the present invention provides a method and apparatus for analyzing a circuit model by reduction, and a computer program product for analyzing the circuit model, and particularly, to a method and apparatus for efficiently analyzing a circuit model which includes a large number of linear floating resistances, an RC network formed of a grounded capacitance, and a large number of independent current sources, and a computer program product for analyzing the circuit model. According to the present invention, the same level of node voltages in a reduced circuit as corresponding node voltages of an existing circuit before the reduction can be maintained, a very large scale circuit with a large number of nodes can be effectively reduced by using an effective method of reducing a circuit including an RC network and current sources and generating a reduced circuit, and time required for analyzing power noise of a chip, which is a significant problem, and time required for designing a semiconductor chip can be significantly reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of analyzing a circuit model by reduction, through an apparatus comprising: a memory, and a processor for executing instructions stored in the memory, the method comprising:
   inputting information about the circuit model, the information comprising a circuit net list with independent current sources and a node state information of each of a plurality of nodes in the circuit model;
   processing the circuit net list with the independent current sources for controlling an error and increasing a reduction ratio;
   selecting one of the nodes to be removed;
   removing the selected node and generating a reduced circuit; and
   processing a reduced circuit net list by the processor from data of the reduced circuit which is stored in the memory.

2. The method of claim 1, wherein the selecting of nodes comprises sorting the nodes in order of degree of the nodes.

3. The method of claim 1, wherein the selecting of nodes comprises determining whether a node is to be removed by comparing a conductance of a capacitor of the node and a sum of conductance of the nodes.

4. The method of claim 1, wherein the removing of the selected node comprises creating a resistor between each two nodes adjacent to the removed node.

5. The method of claim 1, wherein the removing of the selected node comprises creating grounded capacitor at each node adjacent to the removed node.

6. The method of claim 1, wherein the removing of the selected node comprises creating one of the independent current sources at each node adjacent to the removed node.

7. The method of claim 6, wherein the creating of the independent current sources comprises processing a symbolic name and a current scaling factor value of a piecewise linear (PWL) current source while generating the reduced circuit.

8. The method of claim 7, wherein processing the post reduced circuit net list comprises generating the PWL current source using the symbolic name and the current scaling factor value after generating the reduced circuit.

9. A method of analyzing a circuit model by reduction, through an apparatus comprising: a memory; and a processor for executing instructions stored in the memory, the method comprising:
inputting information about the circuit model, the information comprising a circuit net list with independent current sources and a node state information of each of a plurality of nodes in the circuit model;
processing the circuit net list with the independent current sources for controlling an error and increasing reduction ratio;
inputting an RC net list with independent current sources and node state information;
selecting one of the nodes to be removed;
removing the selected node and generating a reduced circuit; and
processing a reduced circuit net list by the processor from data of the reduced circuit which is stored in the memory.

10. A method of analyzing a circuit model by reduction, through an apparatus comprising: a memory; and a processor for executing instructions stored in the memory, the method comprising:
inputting information about the circuit model, the information comprising a circuit net list with independent current sources and a node state information of each of a plurality of nodes in the circuit model;
processing the circuit net list with the independent current sources for controlling an error and increasing reduction ratio;
calculating an effective conductance of a capacitor for a given time step;
selecting one of the nodes to be removed;
removing the selected node and generating a reduced circuit; and
processing a reduced circuit net list by the processor from data of the reduced circuit which is stored in the memory.

11. A method of analyzing a circuit model by reduction, through an apparatus comprising: a memory; and a processor for executing instructions stored in the memory, the method comprising:
inputting information about the circuit model, the information comprising a circuit net list with independent current sources and a node state information of each of a plurality of nodes in the circuit model;
processing the circuit net list with the independent current sources for controlling an error and increasing a reduction ratio;
calculating a conductance of a node in the circuit;
selecting one of the nodes to be removed;
removing the selected node and generating a reduced circuit; and
processing a reduced circuit net list by the processor from data of the reduced circuit which is stored in the memory.

12. A non-transitory computer-readable medium having recorded thereon instructions executed by processing, through an apparatus comprising: a memory; and a processor for executing instructions stored in the memory, the instructions for inputting information about the circuit model, the information comprising a circuit net list with independent current sources and a node state information of each of a plurality of nodes in the circuit model;
processing the circuit net list with independent current sources for controlling an error and increasing reduction ratio;
selecting one of the nodes to be removed;
removing the selected node and generating a reduced circuit; and
processing a reduced circuit net list by the processor from data of the reduced circuit which is stored in the memory.

13. A computer program product for performing a circuit simulation by realizing a reduced circuit of a power distribution network for simulating the power distribution network, the computer program product embodied on a non-transitory computer-readable medium and comprising instructions, through an apparatus comprising: a memory; and a processor for executing instructions stored in the memory, the instructions for:
inputting information about the circuit model, the information comprising a circuit net list with independent current sources and a node state information of each of a plurality of nodes in the circuit model;
processing the circuit net list with the independent current sources for controlling an error and increasing reduction ratio;
selecting one of the nodes to be removed;
removing the selected node and generating a reduced circuit; and
processing a reduced circuit net list by the processor from data of the reduced circuit which is stored in the memory.

14. An apparatus for analyzing a circuit model by reduction, the apparatus comprising:
a processor;
a memory; and
instructions stored in the memory and executed by the processor, for:
inputting information about the circuit model, the information comprising a circuit net list with independent current sources and a node state information of each of a plurality of nodes in the circuit;
processing the circuit net list with the independent current sources for controlling an error and increasing reduction ratio;
selecting one of the nodes to be removed;
removing the selected node and generating a reduced circuit; and
processing a reduced circuit net list by the processor from data of the reduced circuit which is stored in the memory.

* * * * *